UNITED STATES PATENT OFFICE 2,530,774

2,2,4-TRIALKYL-1,2-DIHYDRO-6-ARALKYL-SUBSTITUTED QUINOLINES AND METHOD FOR PRODUCING THE SAME

Henry J. Kehe and Thomas H. Shelley, Cuyahoga Falls, Ohio, assignors to The B. F. Goodrich Company, New York, N. Y., a corporation of New York No Drawing. Application September 10, 1945, Serial No. 615,506

9 Claims. (Cl. 260—283)

This invention relates to new compositions of matter containing the condensation products of aniline successively reacted with a hydrocarbon comprising a double bond connecting two carbon atoms neither of which is present in an aromatic nucleus and having one of said carbon atoms attached to a carbon atom present in an aromatic nucleus and with a ketone in the presence of an acidic condensation catalyst.

The condensation products with which this invention is concerned are exceedingly efficient antioxidants for organic materials which tend to deteriorate in the presence of atmospheric oxygen. Among such materials are paints and varnishes containing such drying oils as linseed oil and tung oil, petroleum oils and their derivatives such as gasolines containing unsaturates, soaps, unsaturated fatty oils, all varieties of natural rubber, such as caoutchouc, balata, gutta percha, latex, reclaimed rubber, artificial rubber isomers, and such synthetic rubbers as polychloroprene and polymers of butadiene, isoprene, 2,3-dimethyl butadiene, piperylene, and the like, as well as their copolymers with acrylonitrile, styrene, methyl acrylate, methyl methacrylate, isobutylene, and other copolymerizable monomers.

These new antioxidants can be added to the material to be preserved in any suitable manner. If desired, they may first be dissolved in a suitable solvent which can be added to the material, or the solution can be employed in making an aqueous emulsion or dispersion which can be added to the material. They may be added to rubber, for example, on a roll mill or in an internal mixer or by any other suitable method; or they may be applied to the surface of the rubber composition either in their pure form or as a solution in a suitable solvent; or they can be dispersed in rubber latex. They may be used in the presence of other compounding ingredients such as any of the ordinary pigments, fillers, dyes, accelerators of vulcanization, or other antioxidants with no deleterious effect upon the antioxidant properties of our new materials. When employed to preserve rubber, they are effective in amounts ranging from 0.1 to 5.0% or more, based on the weight of rubber, and may be used in even smaller proportions in other materials such as the oils referred to above.

Typical examples of these hydrocarbons comprising a double bond connecting two carbon atoms neither of which is present in an aromatic nucleus and having one of said carbon atoms attached to a carbon atom present in an aromatic nucleus that can be employed in the production of these new antioxidants are styrene; alpha substituted styrenes such as alpha methyl styrene, alpha ethyl styrene, etc.; nuclear substituted styrenes such as (ortho, meta or para) methyl styrene, (ortho, meta or para) ethyl styrene, etc., nuclear substituted alpha substituted styrenes such as alpha para dimethyl styrene, etc.; poly (nuclear-alkyl) styrenes; vinyl biphenyl; vinyl naphthalene; styrene dimer (vinyl diphenyl-ethane); indene; dihydronaphthalene; and others. None of these reactants need be pure, for they may be employed in the form of a mixture with other materials of this class.

Among the ketones which can be employed in the reaction are: acetone, methyl ethyl ketone, diethyl ketone, ethyl hexyl ketone, diacetone alcohol, mesityl oxide, phorone, acetyl-acetone, diacetyl, acetonyl-acetone, acetophenone, and other similar compounds.

Examples of the type of catalysts that may be employed are hydrochloric acid, phosphoric acid, sulfuric acid, sodium bisulfate, zinc chloride, aluminum chloride, boron trifluoride, stannic chloride, hydroiodic acid, iodine, amine hydrochlorides, etc. These materials are all either acids themselves or liberate acids upon hydrolysis or upon contact with organic materials, and are usually known as acidic condensation catalysts. The selection of the catalyst for each step of the reaction depends upon the reactants employed. In the reaction involving the addition of aniline to the above hydrocarbons, such catalysts as sulfuric acid and zinc chloride form more or less insoluble complexes with aniline and are, therefore, not as suitable as some of the other catalysts. The preferred catalysts for the reactions involved in the formation of these condensation products are aluminum chloride or HCl for the step involving aniline and the above hydrocarbons, and HCl for the step involving the reaction of the aliphatic ketone with the condensation product of the first step.

When the above-described hydrocarbons and ketones are successively condensed with aniline in the presence of an acidic condensation catalyst according to this invention, the resulting compounds having antioxidant effect are believed to possess the general structural formula:

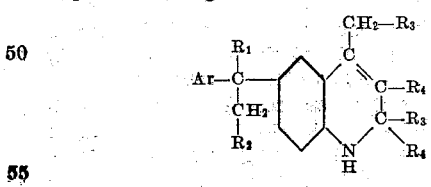

where Ar is a hydrocarbon aryl group, $R_1$ and $R_2$ may be hydrogen or the methyl group and $R_3$ and $R_4$ may be hydrogen or an alkyl hydrocarbon group. Considering the above general formula and its component parts, the group

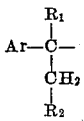

is derived from the hydrocarbon. The portion of the above general formula represented by

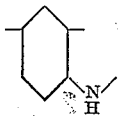

is derived from aniline and the remaining divalent portion of the above general formula represented by

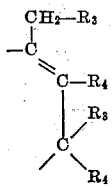

is derived from two moles of the ketone, two moles of the water having been split out.

The condensation may be effected in one of two ways, each consisting of two distinct steps involving two separate chemical reactions. In the first process, aniline is first reacted with a hydrocarbon comprising a double bond connecting two carbon atoms neither of which is present in an aromatic nucleus and having one of said carbon atoms attached to a carbon atom present in an aromatic nucleus and the resulting condensation product subsequently reacted with an aliphatic ketone; in the second process, aniline is first reacted with the ketone and the resulting condensation product subsequently reacted with a hydrocarbon comprising a double bond connecting two carbon atoms neither of which is present in an aromatic nucleus and having one of said carbon atoms attached to a carbon atom present in an aromatic nucleus. All of the reactions are carried out in the presence of an acidic condensation catalyst. The unused reactants and the small amount of lower boiling and resinous by-products sometimes obtained may readily be separated from the desired reaction product, which boils at a high temperature and a fairly narrow range, by heating the mixture and distilling at reduced pressure. The relative proportions of the reactants may vary over a wide range, but for economical production of these condensation products, the use of excess amines and ketones should be held within a minimum to eliminate the added cost of removal and recovery of the unused reactants. The first process outlined above is preferred.

The exact chemical composition of the products obtained by these processes is not known in all cases, but it is believed that they are usually either secondary amines of the dihydroquinoline type or mixtures of these secondary amines with smaller quantities of tertiary amines and/or other materials of a more or less resinous nature. Separation of some of the components of the mixed products may be effected by fractional distillation if desired.

The reactions can usually be carried out at a temperature from about 100° C. to about 300° C. and at either atmospheric or elevated pressure, depending upon the reactants used. In some cases, a reaction vessel with an acid-resistant lining may be required, and usually an agitator is desirable.

The following specific examples are intended as a further illustration of the nature of our invention, and not as a limitation thereon:

*Example I*

A mixture of about 985 parts by weight of aniline, 312 parts by weight of styrene and 195 parts by weight of aniline hydrochloride were placed in a reaction vessel equipped with a reflux condenser and thermometer. The mixture was heated to a temperature of about 175° C. for about four hours. The reaction mixture was then cooled, washed with a 25% aqueous alkali solution and dilute aqueous sodium chloride solutions to remove the catalyst, and then distilled at reduced pressure. Unreacted aniline boiled off at a low temperature. The principal product which is probably mainly ortho (alpha phenyl ethyl) aniline boiled at about 135–150° C. at 1.5 mm. Hg pressure, and solidified at room temperature to a moist mass of crystals which weighed 395 grams when dry representing a 65% yield as based on the complete reaction of the styrene.

0.75 mole of this condensation product of styrene and aniline (143 parts by weight) were placed in a reactor equipped with thermometer, stirrer, means for addition of acetone and a condenser for recovery of the excess acetone. There was added 0.08 mole of hydrochloric acid (8 parts by weight of 37% aqueous solution) to serve as a catalyst and the mixture was heated to about 125° C.

To this heated mixture about 9 moles of acetone (520 parts by weight) were added slowly under the surface of the liquid over a period of about eight hours and at a temperature of about 125 to 130° C. The unreacted vaporized acetone was condensed and collected instead of recycling as would be done in commercial practice. The reaction mixture was then cooled, washed with dilute aqueous sodium hydroxide and sodium chloride solutions to remove the catalyst, and distilled at reduced pressure. After the unreacted materials were distilled off at temperatures up to about 150° C. at about 1 mm. Hg pressure, there was collected 33 parts by weight of a tarry material, the desired product, which boiled at 175 to 200° C. at about 1 mm. Hg pressure and 26 grams of a hard resinous residue of unknown composition.

*Example II*

708 grams of alpha methyl styrene, 1116 grams of aniline and 340 grams of aniline hydrochloride were mixed in a 5-liter flask and refluxed at a temperature of about 170 to 190° C. for about six hours. The reaction mixture was then cooled, washed with dilute aqueous sodium hydroxide and dilute aqueous sodium chloride to remove the catalyst, and distilled under reduced pressure. After the unreacted materials were distilled off, the principal product was collected at 134 to 150° C. at about 0.1 mm. Hg pressure. There was recovered 1007 grams of condensation product, p-amino-2,2-diphenyl propane, representing a 79.6% yield based on complete reaction of the alpha methyl styrene according to the reaction:

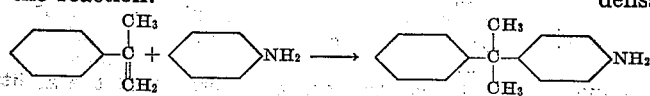

756 grams of p-amino-2,2-diphenyl propane together with 29.5 ml. of concentrated hydrochloric acid (about 37% HCl) were placed in a 2-liter flask fitted with a thermometer, stirrer, dropping funnel, and condenser. The mixture was heated for about eight hours at a temperature of about 120 to 125° C., during which time 1160 grams of acetone were added dropwise beneath the surface of the liquid, and the unreacted acetone was condensed and collected instead of recycling. The reaction mixture was then cooled, washed with dilute aqueous sodium hydroxide solution to remove the catalyst, and the excess p-amino-2,2-diphenyl propane was removed by distillation. The residue which is the desired product obtained after distilling off materials boiling under 160° C. at 1 mm. Hg pressure consisted of 475 grams of an orange, viscous liquid having an index of refraction of 1.6002. An 11 gram sample of the orange, viscous liquid was acetylated with an excess of acetic anhydride at reflux temperature and the excess acetic anhydride was removed from the mixture. It was found that 1.619 grams of acetic anhydride had reacted with the sample which represents 1.02 acetyl groups per mole of sample and indicates that the material is a secondary amine.

On standing for a period of time or with the aid of seeding, the orange, viscous liquid solidifies to form white crystals having a melting point of 73 to 76° C. A chemical analysis of the solid shows 86.5% carbon, 8.75% hydrogen and 4.85% nitrogen present which with the data from the acetylation confirms the formation of 2,2,4 trimethyl 6-(alpha phenyl isopropyl) 1,2-dihydroquinoline according to the following reaction:

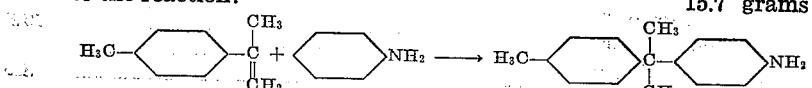

Example III 41.6 ml. of concentrated hydrochloric acid were added to an excess of aniline and the mixture boiled until all the water was driven off, leaving 0.5 gram molecular equivalents (18.25 grams) of anhydrous HCl in the solution. The aniline content was then increased to 372 grams (4 moles), and 132 grams (1 mole) of alpha para dimethyl styrene were added. This mixture was then heated at reflux for about three hours at a temperature of about 185 to 197° C. The reaction mixture was then cooled, washed with a 15% by weight aqueous solution of sodium hydroxide and a 15% aqueous solution of sodium chloride to remove the catalyst, and the excess of aniline was removed by distillation at reduced pressure. The principal product which is p-amino-p'-methyl-2,2-diphenyl propane formed according to the reaction:

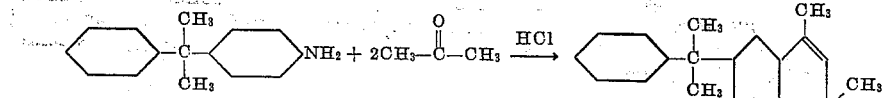

boiled at about 142 to 155° C. at 0.5 mm. Hg pressure and changed on cooling from a liquid to white crystals which melted, when purified, at 80.5 to 81.5° C. The yield was 212 grams, 94.3% of the theoretical based on the alpha para dimethyl styrene. A lower ratio of aniline to alpha para dimethyl styrene would produce this condensation product in yields of about 40 to 70%.

70.8 grams of p-amino-p'-methyl-2,2-diphenyl propane and 2.7 ml. of concentrated hydrochloric acid (about 37% HCl) were placed in a 500 c. c. flask and heated, with stirring, to a temperature of about 120 to 130° C. for about six hours, during which time 219 grams of acetone were added dropwise beneath the surface of the liquid, and the unreacted vaporized acetone was condensed and collected instead of recycling to the reaction mixture. The reaction mixture was cooled, washed with dilute aqueous sodium hydroxide and sodium chloride solutions to remove the catalyst, followed by separation of the water from the oil layer which was distilled under reduced pressure to remove unreacted materials. The principal product was recovered by distillation at reduced pressure at a temperature of about 170 to 205° C. at 1.5 mm. Hg pressure. The yield, 93.6 grams of an orange-colored viscous liquid, is 97.6% of the theoretical and is believed to be 2,2,4 trimethyl 6-(alpha para-tolyl isopropyl) 1,2 dihydroquinoline formed according to the following reaction:

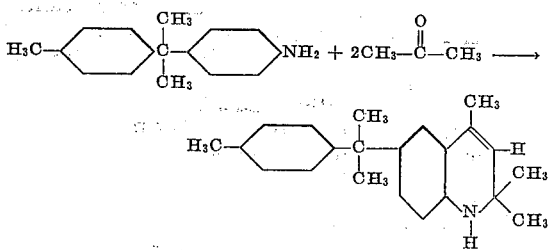

Example IV 126 ml. of concentrated hydrochloric acid (1.5 moles of HCl) were added to an excess of aniline and boiled until the water was driven off. The aniline content of the solution was then increased to 1016 grams (11 moles), and 348 grams of 98% indene (3 moles) were added. The mixture was then refluxed for about five hours at a temperature of about 185 to 200° C. The reaction mixture was cooled, washed as before to remove the HCl catalyst and distilled under reduced pressure to remove the excess aniline. The condensation product of indene and aniline boiled at 160 to 170° C. at about 1 mm. Hg pressure. There was recovered 517 grams, 82% yield based on the indene of this condensation product whose chemical structure has not yet been determined.

15.7 grams of this condensation product of indene and aniline, together with 6.8 ml. of concentrated hydrochloric acid, were placed in a 500 c. c. flask and heated, with stirring, to a temperature of 125 to 135° C. for about four hours, during which time 520 grams of acetone were added slowly beneath the surface of the liquid by means of a dropping funnel, and the unreacted vaporized acetone was condensed and collected instead of recycling to the reaction mixture. After cooling and washing of the reaction mixture, the unreacted materials were removed by distillation at reduced pressure. The composite condensation product of indene, aniline and acetone consisted of 57 grams of a viscous liquid boiling at 170 to 200° C. at about 1 mm. Hg pressure and 45 grams of a hard residue. The chemical structures of these two products have not been determined.

The following is an example of the second process outlined above for preparing these condensation products.

Example V

Equimolar portions of 2,2,4-trimethyl 1,2 dihydroquinoline, a condensation product of acetone and aniline, and alpha methyl styrene were reacted by placing 173 grams of the former and 124 grams of 95% pure alpha methyl styrene in a one-liter three-necked flask fitted with reflux condenser, stirrer and thermometer, followed by bubbling in 3.4 grams of boron trifluoride gas to serve as a catalyst, and heating the mixture for two hours at a temperature of about 180 to 200° C. The catalyst was then destroyed with 15% aqueous sodium hydroxide solution. After removal of the aqueous caustic solution by separatory funnel, the entrained water in the organic phase was taken off, together with unreacted materials, by vacuum distillation. The product, which was further fractionated by distillation under vacuum at higher temperatures, consisted of: A, 31 grams of a slightly viscous tertiary amine boiling at 150 to 155° C. at 1 mm. Hg; B, 148 grams of a very viscous secondary amine boiling at 165-175° C. at 1 mm. Hg; and C, 80 grams of a resinous material as a residue. The total yield was approximately 90% of the theoretical based on the alpha methyl styrene.

The A portion of this condensation product was established as a tertiary amine by absence of acetylation when a portion of it was heated with acetic anhydride. It was found that 0.228 acetyl groups per mole were added indicating that a small quantity of secondary amine is present as a result of incomplete fractionation of the product. Chemical analysis of this material gives 86.6% carbon, 8.65% hydrogen and 4.76% nitrogen which agrees with that of the tertiary amine having the structural formula:

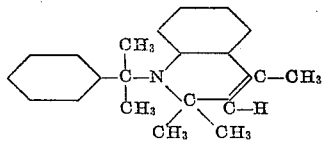

which is a likely product of the reactants employed.

The B portion of this condensation product was established as being the same as the principal product of Example II by comparison of indices of refraction of the liquids which in this case is 1.6000 as compared to that of 1.6002 for the product of Example II; by crystallization of this B portion and comparing the melting point of the solids which are identical, 73° C. to 76° C.; and by a mixed melting point determination using the crystals of the B portion and crystals of the product of Example II. There was no change in the melting point. Therefore, portion B is 2,2,4 trimethyl 6-(alpha phenyl isopropyl) 1,2 dihydroquinoline.

By the proper selection of such operating conditions as temperature and catalyst concentration, the amount of resinous residue, C portion, produced may be kept at a minimum. This process can be also employed to make the other products with which our invention is concerned.

It has also been discovered that the addition of aniline to the hydrocarbons enumerated above can be accomplished in less time with higher yields by employing aluminum chloride as the acid catalyst. The molar ratio of the reactants can be reduced from about four of aniline for each mole of hydrocarbon to about two of aniline for each mole of hydrocarbon by the use of the aluminum chloride catalyst. The time of reaction is reduced from about three to five hours to about 15 minutes. The following example is typical of the results obtained by condensing aniline with the hydrocarbons enumerated above employing aluminum chloride as the catalyst.

Example VI

One mole of alpha methyl styrene (118 grams), two moles of aniline (186 grams), and 0.05 mole of aluminum chloride (6.7 grams) were added to a reaction flask equipped with a reflux condenser, stirrer and thermometer. The mixture was then heated to about 185 to 187° C., the boiling point of the amine. The progress of the reaction was followed by the change in reflux temperature, which increased from about 185° to about 205° C. in 12 minutes. The heating of the mixture was continued for about 30 minutes, during which time the reflux temperature did not rise above about 205° C. The reaction mixture was cooled, washed with dilute aqueous solutions of sodium hydroxide and sodium chloride to destroy and remove the catalyst, and then fractionally distilled at reduced pressure to remove unreacted materials and to recover the product. The condensation product of alpha methyl styrene and aniline boiled at 133 to 153° C. at about 0.1 mm. of Hg pressure. There was recovered 181 grams of this condensation product, which represents a yield of 86% as based on the alpha methyl styrene. From the comparison of the boiling point of this condensation product and that formed in the first step of Example II, it is evident that this product is also mainly p-amino-2,2-diphenyl propane. This condensation product is then reacted with acetone or any other aliphatic ketone in the manner described above. Aluminum chloride can be substituted for HCl in other of the above examples in the step involving the addition of aniline to the hydrocarbons with comparable results in reduction of reaction time and decrease in the amount of aniline employed.

Aniline and any of the various hydrocarbons and ketones enumerated above can be employed as described in the above examples to form their respective condensation products depending upon the combinations of reactants used.

The condensation products of the foregoing examples were tested for their antioxidant effectiveness in the following rubber composition, in which the parts are by weight:

| | |
|---|---:|
| Rubber | 100.0 |
| Zinc oxide | 5.0 |
| Sulfur | 3.0 |
| Carbon black | 50.0 |
| Stearic acid | 3.5 |
| Pine tar | 3.0 |
| 2-mercaptobenzothiazole | 1.0 |
| Antioxidant | as indicated |

In the data tabulated below, which show the antioxidant properties of these new products, each sample contains the following antioxidant substituted in the foregoing recipe: sample A, no antioxidant; sample B, BLE #4, a widely used antioxidant for rubber compositions which is a mixture of the reaction products of diarylamines and a ketone; sample C, Age Rite HP, also a widely used antioxidant comprising a mixture of phenyl beta naphthylamine and diphenyl paraphenylene diamine; sample D is the condensation product of alpha methyl styrene, aniline and acetone of Example II [2,2,4 trimethyl 6-(alpha phenyl isopropyl) 1,2-dihydroquinoline]; and sample E is the condensation product of alpha para dimethyl styrene, aniline and acetone of Example III. The data of samples B and C are given for comparison with these new antioxidants to demonstrate their antioxidant activity.

The stress-strain figures are averages obtained from two test sets of each sample, one vulcanized for 45 minutes at 280° F., the other for 75 minutes at 280° F. The flexing figures are averages obtained from eight test sets of each sample, vulcanized for 75 minutes at 280° F. and at four different shelf-aging periods before and after oven-aging on each test. In the flexing columns, the number 0 stands for no cracking, the number 10 for complete breaking, and the other numbers for intermediate degrees of cracking. In the following table, "T" indicates the per cent retention of ultimate tensile strength and "E" indicates the per cent retention of ultimate elongation after aging in a Bierer bomb 96 hours in oxygen at 70° C. and 300 lbs. per sq. in. pressure. The flexing tests made on a vertical De Mattia machine set at 300 one-inch strokes per minute in a constant temperature atmosphere of 80° C. indicate the flex life of the samples at 1,000 kilocycle flexures after being aged in a Geer oven 14 days at 70° C.

| Antioxidant Samples | Parts Used | T per cent retained | E per cent retained | Flexing Index |
|---|---|---|---|---|
| A | 0 | 19 | 41 | 10 |
| B | 2 | 53 | 81 | 4.4 |
| C | 2 | 72 | 82 | 3.8 |
| D | 2 | 68 | 86 | 2.8 |
| E | 2 | 64 | 91 | 2.4 |
| B | 4 | 51 | 80 | 3.0 |
| C | 4 | 70 | 82 | 5.2 |
| D | 4 | 61 | 86 | 2.0 |
| E | 4 | 61 | 80 | 2.6 |

Thus, it is evident from the above data that these new products have age-resisting powers substantially equivalent to that of the two popular anti-oxidants in preventing loss of tensile strength and elongation. It is also to be noted that they are superior to the popular antioxidants in preventing the cracking of vulcanized rubber compositions upon repeated flexing. Similar results may be obtained when the other condensation products of the reactions of aniline with the above enumerated hydrocarbons and ketones are employed as rubber antioxidants.

Although we have herein disclosed specific embodiments of our invention, we do not intend to limit ourselves solely thereto, but to include all of the obvious variations and modifications falling within the spirit and scope of the appended claims.

We claim:
1. A compound having the formula

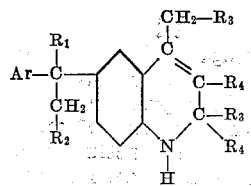

where Ar is a hydrocarbon aryl group, $R_1$ and $R_2$ are members selected from the group consisting of hydrogen and the methyl radical and $R_3$ and $R_4$ are selected from the group consisting of hydrogen and alkyl hydrocarbon radicals having from one to six carbon atoms.

2. A compound having the formula

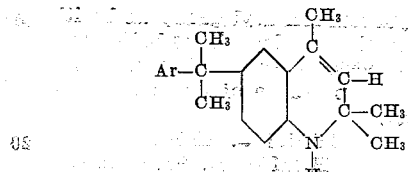

where Ar is a hydrocarbon aryl group.

3. A compound having the formula

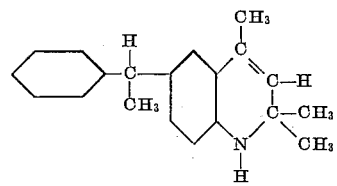

4. A compound having the formula

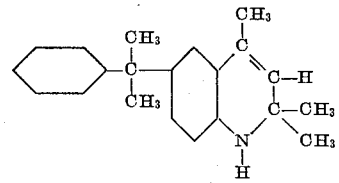

5. A compound having the formula

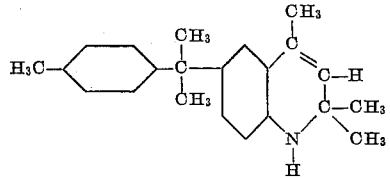

6. The process for preparing a compound of claim 2 which comprises reacting one mole of aniline with each mole of a hydrocarbon having the formula

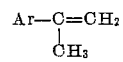

where Ar is a hydrocarbon aryl group, at atmospheric pressure, at reflux temperature and in the presence of an acidic condensation catalyst and reacting each mole of the condensation product thus formed with at least two moles of acetone under the same reaction conditions.

7. The process for preparing the compound of claim 4 which comprises reacting one mole of aniline with each mole of alpha methyl styrene, at atmospheric pressure, at reflux temperature and in the presence of an acidic condensation catalyst and reacting each mole of the condensation product thus formed with at least two moles of acetone under the same reaction conditions.

8. The process for preparing the compound of claim 5 which comprises reacting one mole of aniline with each mole of alpha, para-dimethyl styrene at atmospheric pressure, at reflux temperature and in the presence of an acidic condensation catalyst and reacting each mole of the condensation product thus formed with at least two moles of acetone under the same reaction conditions.

9. The process for preparing the compound of claim 2 which comprises condensing aniline successively with a hydrocarbon having the formula

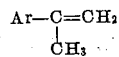

where Ar is a hydrocarbon aryl group and with acetone, the successive condensations being carried out at atmospheric pressure and reflux temperature and in the presence of an acidic condensation catalyst.

HENRY J. KEHE.
THOMAS H. SHELLEY.

REFERENCES CITED

The following references are of record in the file of this patent:

UNITED STATES PATENTS

| Number | Name | Date |
|---|---|---|
| 2,064,752 | Ingram | Dec. 15, 1936 |
| 2,095,126 | Craig | Oct. 5, 1937 |
| 2,160,200 | Dunbrook et al. | May 30, 1939 |
| 2,268,419 | Paul | Dec. 30, 1941 |

OTHER REFERENCES

Reddeline et al., Berichte 65, pages 1511–1512 (1932).

Hickinbottom, J. Chem. Soc. 1934, pages 319–323.